Jan. 13, 1942.    D. S. ELLIS    2,270,205
BEARING ELEMENT FOR MACHINE PARTS
Filed April 27, 1940

Inventor:
Daniel S. Ellis,
by Emery, Booth, Townsend, Miller Weidner.
Attys.

Patented Jan. 13, 1942

2,270,205

UNITED STATES PATENT OFFICE 2,270,205

BEARING ELEMENT FOR MACHINE PARTS

Daniel S. Ellis, Cleveland, Ohio, assignor to Hunt-Spiller Manufacturing Corporation, Boston, Mass., a corporation of Massachusetts Application April 27, 1940, Serial No. 332,094

7 Claims. (Cl. 308—3)

This invention relates to bearing elements for machine parts which in use rub against or are rubbed upon by cooperating parts as one moves relative to the other. The object is to provide an improved construction for such bearing elements having a unitary bearing surface presented to the cooperating element and embodying both cast iron and bronze or similar bearing metal. An example is the crosshead shoe or gib such as is used on a locomotive to position the crosshead on the guide. In the accompanying drawing and in the specification I will by way of example specifically describe the construction of a crosshead shoe and in particular a shoe of channel form as used on the well known alligator type of crosshead. The invention, however, is obviously applicable to the equivalent gibs or bearing members of a single guide crosshead, the Laird type of crosshead and the multiple-bearing ledge type of crosshead and other machine parts in which the motion is analogous.

My invention will be well understood by reference to the following description taken in connection with the accompanying drawing, wherein—

The advantages in moving machine parts of the type under consideration of providing a bearing surface partly of cast iron and partly of bronze are well appreciated. For example, it is common to make piston rings of two series of segments side by side, one series of bronze and one of cast iron. To incorporate bronze in many types of iron bearing elements so that the two elements would act together as one has hitherto presented difficulties. It will be understood that the problem and its solution are quite distinct from that arising when inserts of soft metal, such as babbitt, are applied to recesses in an iron bearing member. Because of its softness and low melting point babbitt is to be distinguished from bronze or the like, relatively hard and of relatively high melting point, although the latter is substantially less than the melting point of cast iron. Hitherto it has been proposed to insert blocks of bronze in a preformed iron structure, but the blocks fitted loosely and were not solidly maintained and the wearing surface consequently was not what was desired. It has also been proposed to apply bronze by welding it into recesses in a preformed iron member but the heat necessary for this operation altered the composition of the iron and hardened it. One result of this was difficulty in machining the bearing surface to its final form. In accordance with the present invention the characteristics of the two metals as exposed in the bearing surface of the crosshead shoe or other element are chemically and physically substantially like those of single castings of the same metals.

Figure 1:
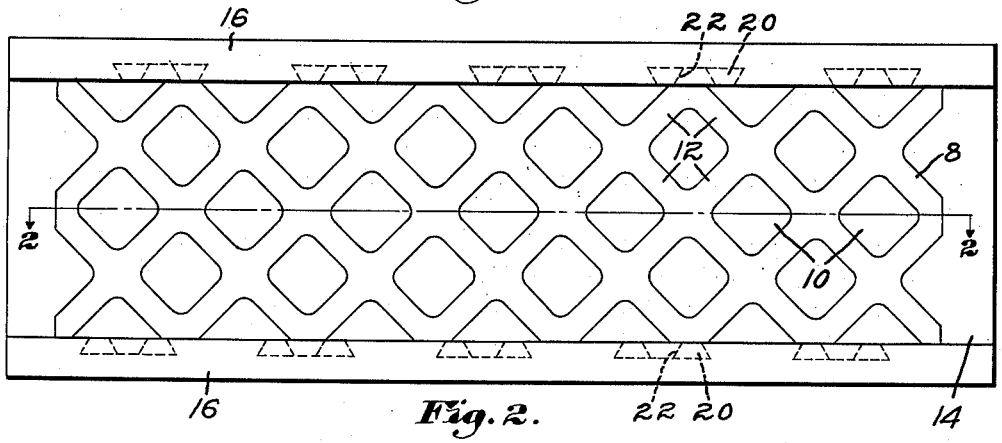
Fig. 1 is a plan of the shoe illustrative of the invention.

To construct a crosshead shoe such as is shown in the drawing I may form by casting a grid-like plate 8 of bronze which, as seen in Fig. 1, may be of a length to correspond substantially with the length of the shoe and of a width corresponding to the width of the cooperating guide. The grid shown in the drawing takes the form of a regular rectangular criss-cross of bars defining between them a multiplicity of openings 10, preferably disposed in lines diagonal to the length of the shoe and therefore relatively staggered as shown, and defining between them broad faced, intervening bars 12 extending in both diagonal directions, the construction being such that in any longitudinal zone in the direction of reciprocation of the shoe the open spaces alternate with substantial intervening bodies of bronze.

Figure 2:
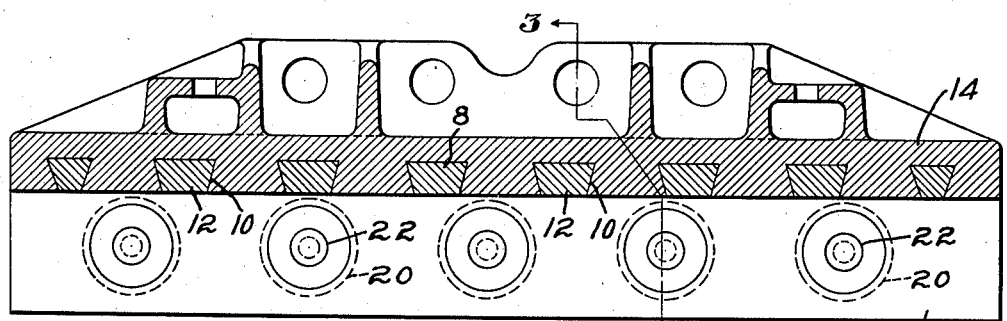
Fig. 2 is a section on the line 2—2 of Fig. 1.
Figure 3:
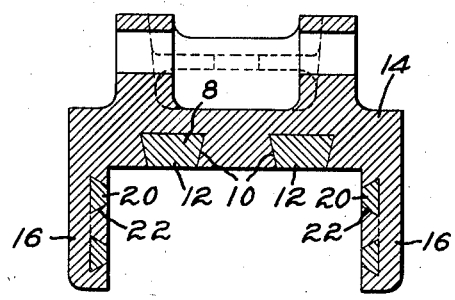
Fig. 3 is a section on the line 3—3 of Fig. 2.

If we consider any one of the openings and the adjacent parts 12 of the grid which bound it, the latter will be seen to be an example of an annular band bounding an opening 10. The walls of the openings are suitably shouldered for a purpose which will presently appear, preferably by bevelling them so that the opening 10 defined therebetween is of greater area adjacent the bearing face of the completed shoe, as shown in Fig. 2. The thickness of the plate is at least substantially equal to the normal wear of the shoe, say, for instance, $\frac{3}{16}$". For reasons of economy it is not desirable greatly to exceed such a limit.

A plate such as described may be placed in a mold and the main body of the shoe comprising the web 14 and the flanges 16 cast around it from cast iron of the type usually selected for similar articles to provide suitable wearing quality so that the iron flows about the plate and through the openings 10 to receive the bronze as in a matrix. Bronze has a lower melting point than cast iron. Therefore, while the plate is not merely dissipated by contact with the hot iron but serves, as it were, as a part of a mold into which the iron enters to form a structure of complementary form, the bronze is ultimately melted by the heat of the iron as it enters the mold and sets. Thus, presumably at some time during the casting operation we have an iron matrix substantially as shown in Fig. 2, more or less congealed and having grid-like channels therein which are filled with liquefied bronze. Then the bronze itself sets and in so doing it shrinks and the continuously connected elements 12 of the grid constrict with a centripetal action about the bodies of iron which have been formed at the location of the openings 10 in tight contracted gripping relation thereabout. The bodies of iron thus gripped are undercut to correspond to the bevelling of the walls of the original openings of the plate, a construction contributing to firm retention of the plate in the finished structure. The result is that in the completed composite casting the bronze is firmly maintained in the iron matrix without looseness.

The composite wearing surface for the web of the shoe thus provided is finished off by machining to provide a surface wherein substantial areas of bronze and cast iron are distributed throughout the surface, both the bronze and iron being present in like substantial quantities. Thus, for example, the area of iron exposed may be about 50% of the surface and the bronze about 50% as distinguished from mere minor areas of one relative to the other. The combination of bronze and iron lengthens the life of the shoe and by virtue of the intimate union between them caused by the shrinkage of the bronze about the projecting portions of the iron the two are consolidated as a uniform surface which is maintained throughout the life of the shoe. As the shoe wears, substantially the entire thickness of the bronze plate is consumed.

In connection with the formation of a shoe in the manner described having a pre-cast grid-like plate to cooperate with the horizontal surface of the crosshead guide, I may also incorporate bronze elements in the flanges 16, and I have herein shown blocks of bronze 20 of annular form having central openings 22 and walls at either circumference which flare inwardly toward the bearing surface of the shoe, as best seen in Fig. 1. These blocks are positioned in the mold before the iron is poured and the iron will enter about them and into the openings 22. The bronze is melted as before, and as it congeals, the annular bands will shrink constricting upon the iron which has entered into the openings 22, thus providing after machining a firm relation of the parts and a uniform consolidated guide surface in the completed shoe.

Obviously the plate 8 may be either originally cast in the form and size in which it is to be used, as shown in Fig. 1, or larger plates may be provided by a casting operation which may then be cut and trimmed to the desired dimensions for incorporation in any given size of shoe.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. A bearing element for a machine part for use in connection with a cooperating element having rubbing motion relative thereto comprising a grid-like plate of bronze or the like of overall dimensions corresponding substantially to those of the bearing face of the element and of a thickness at least substantially equal to the ordinarily permissible wear having a multiplicity of openings therethrough bounded by continuously connected elements of the grid and a body of unmodified cast iron in which said plate is received and entering and filling the openings, the said connected elements being in tight contracted gripping relation to the iron which fills the openings, such elements and the iron exposed therebetween presenting a uniform consolidated wearing surface to the cooperating element aforesaid and one wherein the bronze and iron are present in co-substantial areas.

2. A bearing element for a machine part for use in connection with a cooperating element having rubbing motion relative thereto comprising a grid-like plate of bronze or the like of overall dimensions corresponding substantially to those of the bearing face of the element and of a thickness at least substantially equal to the ordinarily permissible wear having a multiplicity of openings therethrough, at least a portion of the walls of which are shouldered inwardly of the bearing face and bounded by continuously connected elements of the grid and a body of unmodified cast iron in which said plate is received and entering and filling the openings, the said connected elements being in tight contracted gripping relation to the iron which fills the openings, such elements and the iron exposed therebetween presenting a uniform consolidated wearing surface to the cooperating element aforesaid and one wherein the bronze and iron are present in co-substantial areas.

3. A bearing element for a machine part for use in connection with a cooperating element having rubbing motion relative thereto comprising a block of bronze having an opening therethrough bounded by a continuous ring-like band, said block being of a thickness at least substantially equal to the ordinarily permissible wear, and a body of unmodified cast iron in which said plate is received to form a portion of the wearing face of said body, the iron entering and filling the opening, the said band being in tight contracted gripping relation to the iron which fills said opening.

4. A bearing element for a machine part for use in connection with a cooperating element having rubbing motion relative thereto comprising a grid-like plate of bronze or the like of overall dimensions corresponding substantially to those of the bearing face of the element and of a thickness at least substantially equal to the ordinarily permissible wear having a multiplicity of openings therethrough disposed in overlapping staggered relation with reference to the direction of relative movement of the cooperating elements, said openings being bounded by continuously connected elements of the grid and a body of unmodified cast iron in which said plate is received and entering and filling the openings, the said connected elements being in tight contracted gripping relation to the iron which fills the openings, such elements and the iron exposed therebetween presenting a uniform consolidated wearing surface to the cooperating element aforesaid and one wherein the bronze and iron are present in co-substantial areas.

5. A bearing element for a machine part for use in connection with a cooperating element having rubbing motion relative thereto, the bearing surface of which throughout a depth at least substantially equal to the ordinarily permissible wear comprises an iron matrix having embedded therein flush with the outer surface thereof a grid of bronze or the like comprising integrally interconnected bars bounding enclosed areas into which the iron enters, the iron and bronze being distributed in co-substantial areas throughout said surface and having the physical and chemical characteristics of independent castings thereof and being in mutual consolidated tight gripping relation.

6. A bearing element for a machine part for use in connection with a cooperating element having rubbing motion relative thereto, the bearing surface of which throughout a depth at least substantially equal to the ordinarily permissible wear comprises an iron matrix having embedded therein flush with the outer surface thereof one or more bronze inserts which comprise one or more annular bands bounding an opening into which the iron enters, the iron and bronze having the physical and chemical characteristics of independent castings thereof and being in mutual consolidated tight gripping relation.

7. A bearing element for a machine part for use in connection with a cooperating element having rubbing motion relative thereto, the bearing surface of which throughout a depth at least substantially equal to the ordinarily permissible wear comprises an iron matrix having embedded therein flush with the outer surface thereof one or more bronze inserts which comprise one or more annular bands bounding an opening into which the iron enters, at least a portion of the walls of said bands being shouldered inwardly of the bearing face, the iron and bronze having the physical and chemical characteristics of independent casting thereof and being in mutual consolidated tight gripping relation.

DANIEL S. ELLIS.